(12) United States Patent
Na et al.

(10) Patent No.: US 8,082,940 B2
(45) Date of Patent: Dec. 27, 2011

(54) WATER RESERVOIR FOR VEHICLE HAVING DRAIN VALVE OPERATED BY TRAVELING WIND

(75) Inventors: Sung Wook Na, Gyeonggi-do (KR); Yong Sun Park, Gyeonggi-do (KR)

(73) Assignees: Hyundai Motor Company, Seoul (KR); Kia Motor Corporation, Seoul (KR)

( * ) Notice: Subject to any disclaimer, the term of this patent is extended or adjusted under 35 U.S.C. 154(b) by 430 days.

(21) Appl. No.: 12/434,712

(22) Filed: May 4, 2009

(65) Prior Publication Data

US 2010/0116363 A1   May 13, 2010

(30) Foreign Application Priority Data

Nov. 7, 2008   (KR) .................. 10-2008-0110710

(51) Int. Cl.
*F16K 17/36* (2006.01)
(52) U.S. Cl. ........................................ 137/38; 137/351
(58) Field of Classification Search .................... 137/38, 137/39, 47, 78.5, 351, 899, 899.2; 244/53 B, 244/58
See application file for complete search history.

(56) References Cited

U.S. PATENT DOCUMENTS

| | | | | |
|---|---|---|---|---|
| 2,946,339 A | * | 7/1960 | Fairchild et al. | 137/38 |
| 3,972,494 A | * | 8/1976 | Drews | 244/130 |
| 4,257,362 A | * | 3/1981 | Leonardi | 123/392 |
| 6,467,698 B2 | * | 10/2002 | Gaarder et al. | 237/12.3 B |
| 6,858,134 B2 | * | 2/2005 | Yates | 210/167.01 |
| 7,337,799 B2 | * | 3/2008 | Delfino et al. | 137/79 |

FOREIGN PATENT DOCUMENTS

| | | |
|---|---|---|
| JP | 10-280958 | 10/1998 |
| JP | 11-245972 | 9/1999 |
| KR | 10-2007-0018194 | 2/2007 |

* cited by examiner

*Primary Examiner* — John Rivell
*Assistant Examiner* — Seth Faulb
(74) *Attorney, Agent, or Firm* — Edwards Wildman Palmer LLP; Peter F. Corless

(57) ABSTRACT

The present invention provides a cooling water reservoir for a fuel cell vehicle, in which a drain valve operated by traveling wind is mounted in a reservoir housing of the reservoir such that unnecessary water in an amount corresponding to the amount of product water, generated in the fuel cell stack during operation of a fuel cell system and flowing in the reservoir housing, can be discharged through the drain valve automatically in real-time, thus preventing the water in the reservoir housing from overflowing due to the inflow of the product water generated in the fuel cell stack during operation of the fuel cell system.

7 Claims, 8 Drawing Sheets

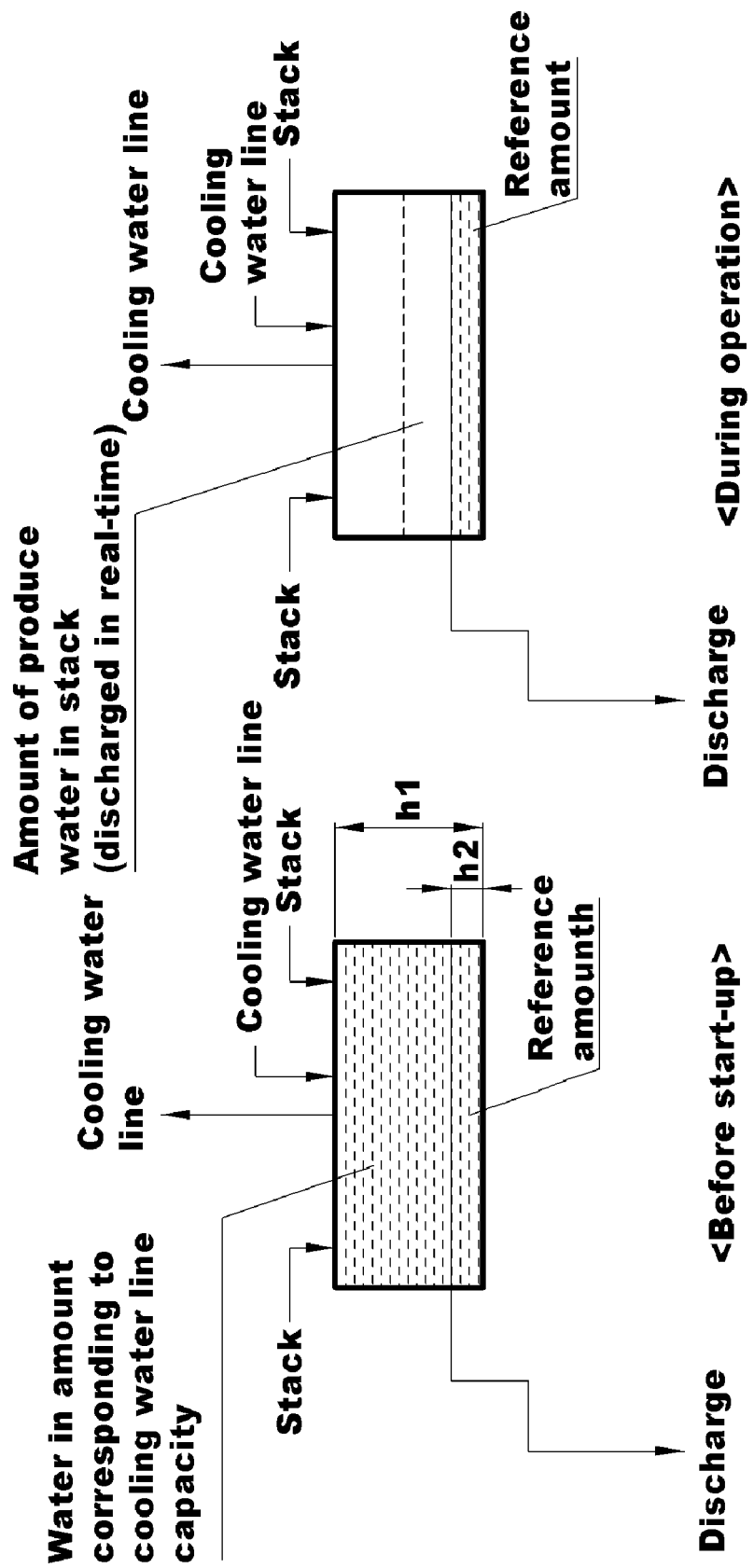

US 8,082,940 B2

WATER RESERVOIR FOR VEHICLE HAVING DRAIN VALVE OPERATED BY TRAVELING WIND

CROSS-REFERENCE TO RELATED APPLICATION

This application claims under 35 U.S.C. §119(a) the benefit of Korean Patent Application No. 10-2008-0110710 filed Nov. 7, 2008, the entire contents of which are incorporated herein by reference.

BACKGROUND (a) Technical Field

The present disclosure relates to a water reservoir for a vehicle. More particularly, it relates to a cooling water reservoir for a fuel cell vehicle, which stores and supplies cooling water for cooling a fuel cell stack during operation and, at the same time, collects product water generated in the fuel cell stack.

(b) Background Art

A fuel cell system generates electrical energy by electrochemically converting chemical energy derived from a fuel directly into electrical energy by oxidation of the fuel.

The fuel cell system comprises a fuel cell stack for generating electricity by electrochemical reaction, a hydrogen supply system for supplying hydrogen as a fuel to the fuel cell stack, an oxygen (air) supply system for supplying oxygen containing air as an oxidant required for the electrochemical reaction in the fuel cell stack, a thermal management system (TMS) for removing reaction heat from the fuel cell stack to the outside of the fuel cell system, controlling operation temperature of the fuel cell stack, and performing water management function, and a system controller for controlling overall operation of the fuel cell system.

The fuel cell system having the above configuration generates electricity by the electrochemical reaction using hydrogen as the fuel and oxygen containing air and discharges heat and water as by-products.

Since the fuel cell system generates heat as a by-product, the system should be equipped with an apparatus for cooling the fuel cell stack to prevent an increase in the temperature of the fuel cell stack.

FIG. 1 is a schematic diagram of a cooling system for a fuel cell vehicle, in which a two-loop system is shown.

As shown in FIG. 1, the cooling system comprises a first cooling loop 10 and a second cooling loop 14. An intermediate heat exchanger 12 is used to cool a fuel cell stack 11. In the first cooling loop 10, cooling water is circulated through the fuel cell stack 11, the intermediate heat exchanger 12, and a circulation pump 13. In the second cooling loop 14, cooling water is circulated through a circulation pump 15, the intermediate heat exchanger 12, and a radiator 16.

In more detail, the cooling water circulated through the first cooling loop 10 by the circulation pump 13 passes through a cooling water line of the fuel cell stack 11 to remove heat from the fuel cell stack 11, and then the cooling water of the first cooling loop 10 transfers heat to the cooling water circulating through the second cooling loop 14 at the intermediate heat exchanger 12.

The cooling water of the second cooling loop 14, which receives heat from the cooling water of the first cooling loop 10 at the intermediate heat exchanger 12, radiates heat while passing through the radiator 16 and is then cooled. As a result, reaction heat of the fuel cell stack 11 is removed by the cooling water of the first cooling loop 10, the intermediate heat exchanger 12, the cooling water of the second cooling loop 14, and the radiator 16.

In this case, when the cooling system is turned off, the cooling water in the first cooling loop 10 for primarily cooling the fuel cell stack 11 flows from the first cooling loop 109 to the bottom of the cooling system by gravity and is collected in a cooling water reservoir (water tank) 20 mounted at the bottom of the vehicle. When the cooling system is turned on and a vacuum state is created inside the system by a suction pump, the water in the reservoir 20 flows up to the inside of the system by a pressure difference.

The cooling water reservoir having the above functions must satisfy the sealing requirements of connection portions and have the capability of efficiently supplying the cooling water to the cooling system in a vacuum state.

FIG. 2 is a perspective view showing a conventional reservoir for a fuel cell vehicle. A reservoir 20 having a predetermined space in which cooling water (including product water) is stored comprises a reservoir housing 21 having a predetermined inner space, a cover 22 covering the top of the reservoir housing 21, and a plurality of ports 23 to 26 installed at the top of the cover 22.

The plurality of ports 23 to 26 include an intake port 23 connected to the suction pump 17 of FIG. 1 such that the cooling water is drawn from the inner space of the reservoir housing 21 through the intake port 23 and supplied to the cooling water line during operation of the suction pump 17. The cooling water flowing through the intake port 23 is supplied to the cooling water line of the first cooling loop in the cooling system of FIG. 1 and then circulated.

Since the intake port 23 extends to the bottom of the reservoir housing 21, it can suck the water at the bottom of the reservoir housing 21, and therefore it is possible to stably supply water even if the vehicle is inclined on a slope.

Moreover, the plurality of ports 23 to 26 include a cooling water collection port 24 through which the cooling water in the cooling water line is collected when the vehicle is turned off, a product water inlet port 25 connected to the fuel cell stack 11 to extract product water from the fuel cell stack 11, and an overflow port 26 through which excess water in the inner space of the reservoir housing 21 is discharged.

The above-described reservoir for a fuel cell vehicle is mounted at the bottom of the vehicle such that the water in the cooling water line is collected therein by gravity when the fuel cell system is turned off and the cooling water in the reservoir is supplied to the cooling water line of the cooling system by the operation of the suction pump when the fuel cell system is turned on.

Korean Patent Application No. 2007-0130091, for example, discloses a cooling water reservoir for a fuel cell vehicle. However, the conventional reservoir has a problem that a considerable amount of product water overflows when the fuel cell system is turned off. That is, the product water generated during traveling of the vehicle is collected in real-time in the reservoir (water tank) and, further, the cooling water in the cooling water line flows down to the reservoir when the vehicle is turned off. As a result, a considerable amount of water overflows on the surface of the parking lot where the vehicle after being driven is parked.

In more detail, the product water generated in the fuel cell stack is collected in the reservoir mounted at the bottom of the vehicle during traveling of the vehicle. Moreover, when the vehicle is turned off, the cooling water circulating through the cooling water line is also collected in the reservoir. Accordingly, the water remaining in the reservoir, the product water generated in the fuel cell stack during traveling of the vehicle, and the water in the cooling water line are all collected in the reservoir. As a result, the water in an amount exceeding the reservoir capacity overflows on the surface of the parking lot.

For example, if about 13 L water is pumped from the reservoir containing about 16 L water to the cooling water line during start-up of the fuel cell vehicle, about 3 L water remains in the reservoir. Then, if product water ($\alpha$ L) generated in the fuel cell stack during traveling of the vehicle flows down and is collected in real-time in the reservoir, the amount of collected water is $(3+\alpha)$ L. Subsequently, when the vehicle is turned off, 12 L cooling water in the cooling water line flows down to the reservoir. As a result, the amount of water in the reservoir is $(16+\alpha)$ L, and a L water exceeding the reservoir capacity is discharged through the overflow port to the surface of the parking lot.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art. Accordingly, the present invention provides a cooling water reservoir for a fuel cell vehicle, which can effectively prevent water in the reservoir from overflowing due to the inflow of product water generated in a fuel cell stack during operation of a fuel cell system. Particularly, the present invention provides a cooling water reservoir for a fuel cell vehicle, which can discharge unnecessary water automatically in real-time during traveling of the vehicle.

The present invention, however, is not limited to the cooling water reservoir for a fuel cell vehicle, and can be applied to a water reservoir for a vehicle equipped with a drain valve operated by traveling wind such that unnecessary water is discharged from the water reservoir automatically in real-time during traveling of the vehicle.

In one aspect, the present invention provides a water reservoir for a vehicle including a reservoir housing capable of storing and discharging water, the water reservoir comprising a drain valve installed in the reservoir housing and being able to be opened by traveling wind to discharge water during traveling of the vehicle. The drain valve comprises a valve housing, an operating valve rod and an elastic member. The valve housing is installed in the reservoir housing and includes an inlet port formed on a rear end wall of the valve housing positioned inside the reservoir housing and an outlet port formed on a front side wall of the valve housing positioned outside the reservoir housing. The operating valve rod includes a wind receiving plate which is installed on a front surface of the valve housing and moved by traveling wind and a shielding plate which is movable integrally with the wind receiving plate to open and close the inlet port of the valve housing. The elastic member is disposed between the valve housing and the operating valve rod.

In a preferred embodiment, the water reservoir is a cooling water reservoir for a fuel cell vehicle, the cooling water reservoir storing cooling water in a reservoir housing, supplying the cooling water to a cooling water line for cooling a fuel cell stack, and collecting product water, generated in the fuel cell stack during operation, in the reservoir housing.

In another preferred embodiment, the drain valve installed in the reservoir housing is positioned at a predetermined height from a bottom surface of the reservoir housing. The height can be set to a water level obtained by subtracting an amount of cooling water in the cooling water line from a water storage capacity of the reservoir housing, such that the water in an amount corresponding to the amount of the product water, generated in the fuel cell stack and flowing in the reservoir housing, is discharged through the drain valve in real-time, except for the amount of the cooling water pumped to the cooling water line during operation of the fuel cell stack.

In still another preferred embodiment, the operating valve rod has a structure in which the wind receiving plate is installed on a front end of a rod portion, the shielding plate is installed on a rear end of the rod portion, and the rod portion is inserted into the valve housing to penetrate a through-hole formed on a rear end wall of the valve housing, such that the shielding plate opens and closes the inlet port positioned inside the reservoir housing.

In yet another preferred embodiment, the inlet port is formed to penetrate the rear end wall of the valve housing to be able to be closed when the shield plate is in close contact with the rear end wall of the valve housing.

In still yet another preferred embodiment, an O-ring for sealing is interposed between the rear end wall of the valve housing and the shielding plate.

In a further preferred embodiment, the elastic member is a coil spring mounted between a rear surface of the wind receiving plate and the rear end wall of the valve housing.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 7 is a schematic diagram showing a reservoir for a fuel cell vehicle in accordance with the present invention before start-up and during operation.

Figure 1:
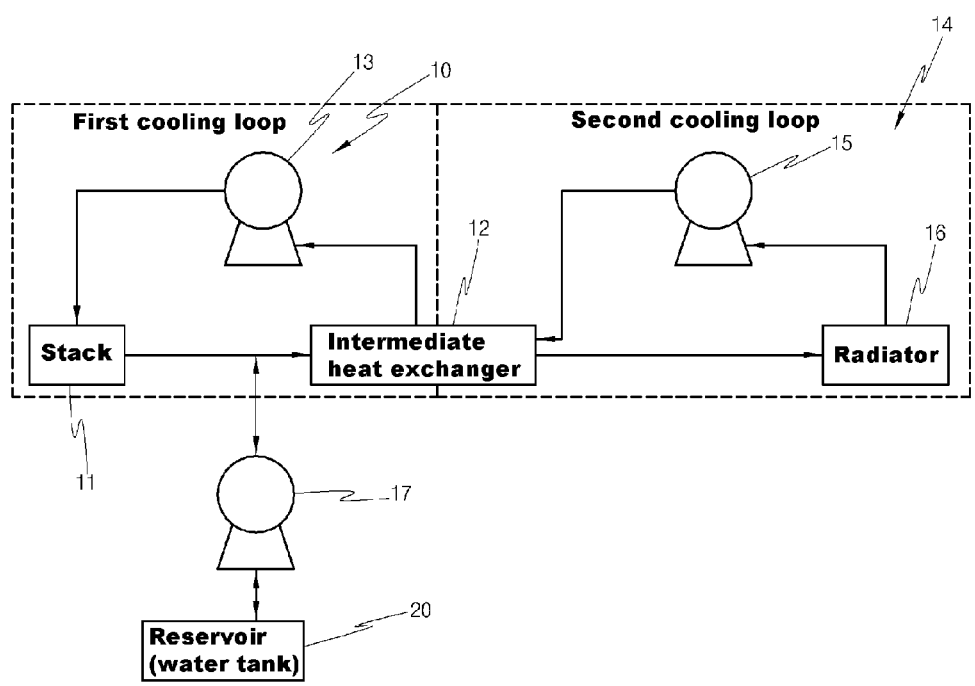
FIG. 1 is a schematic diagram of a cooling system for a fuel cell vehicle.
Figure 2:
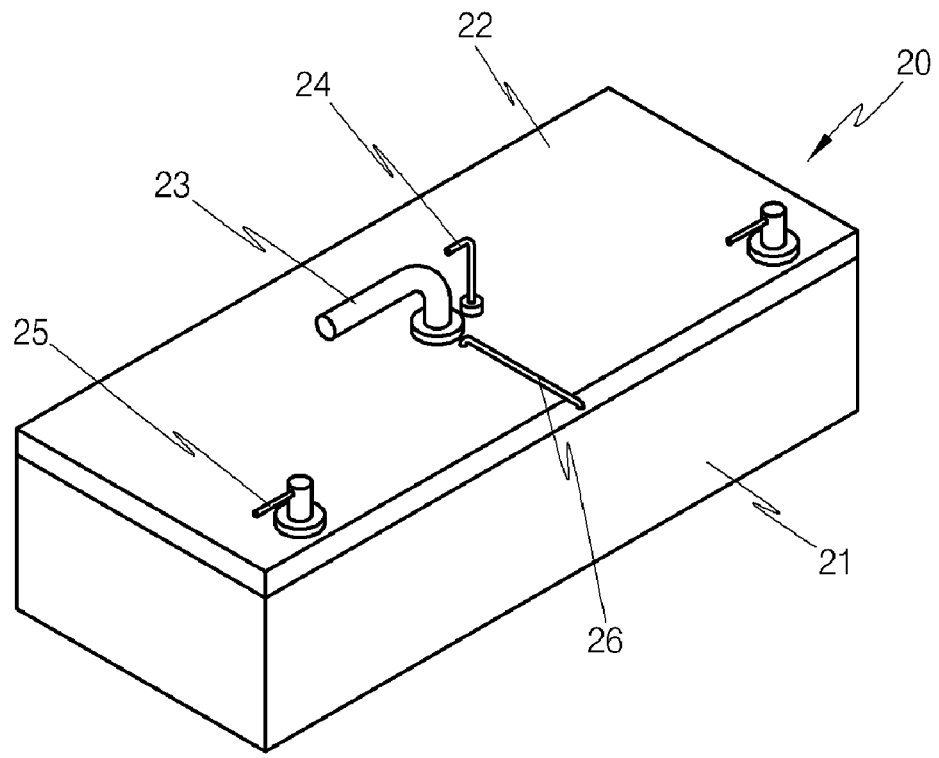
FIG. 2 is a perspective view showing a conventional reservoir for a fuel cell vehicle.

Reference numerals set forth in the Drawings includes reference to the following elements as further discussed below:

| | | | |
|---|---|---|---|
| 20: | reservoir | 21: | reservoir housing |
| 22: | cover | 23: | intake port |
| 24: | cooling water collection port | 25: | product water inlet port |
| 26: | overflow port | 21a: | drain port |
| 30: | drain valve | 31: | valve housing |
| 33: | inlet port | 34: | outlet port |
| 35: | through-hole | 36: | O-ring |
| 37: | operating valve rod | 38: | elastic member (coil spring) |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 3:
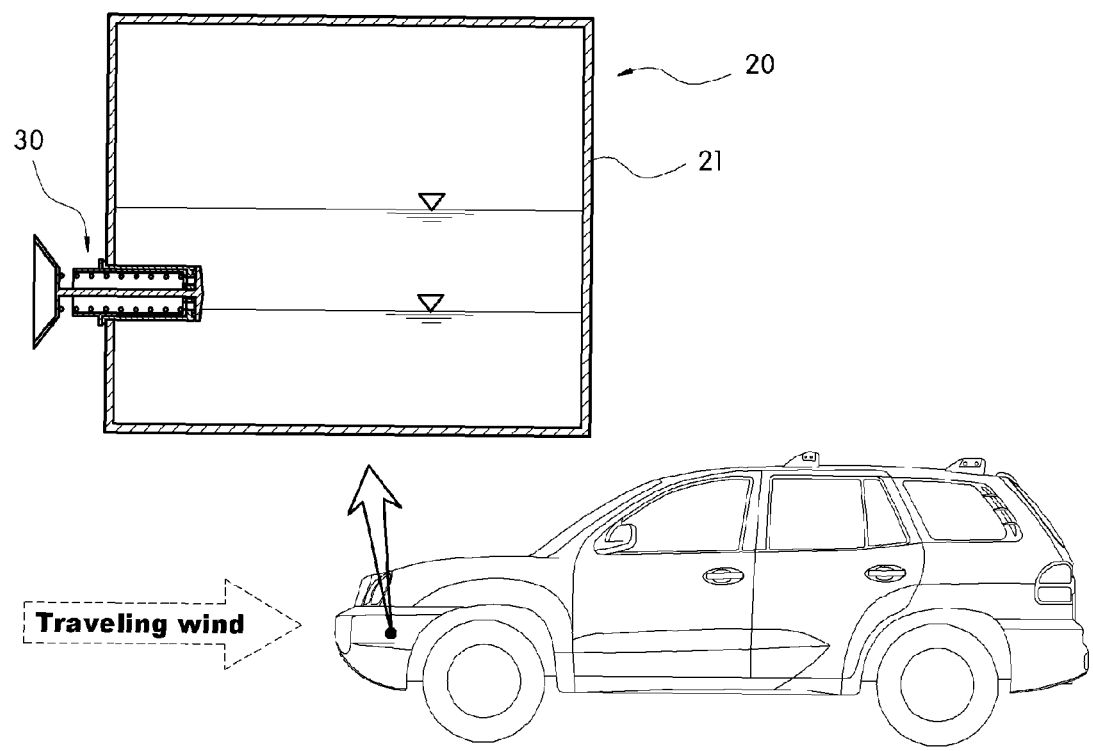
FIG. 3 is a diagram showing a drain valve installed in a reservoir housing in accordance with a preferred embodiment of the present invention.

FIG. 3 shows a cooling water reservoir 20 in accordance with the present invention, in which a drain valve 30 operated by traveling wind is installed in a reservoir housing 21 of the reservoir 20.

As shown in FIG. 3, when a vehicle equipped with the reservoir 20 of the present invention having the drain valve 30 operated by traveling wind is traveling, the drain valve 30 is opened such that the water in an amount corresponding to the amount of product water, generated in the fuel cell stack during the operation of the fuel cell system and flowing in the reservoir 20, is discharged from the reservoir 20 automatically in real-time.

In this case, although an electronic valve (opened during start-up of the vehicle to discharge product water and closed during turn-off to collect water) can be used, a relatively inexpensive mechanical valve (operated by traveling wind) as the drain valve can be used to discharge the product water generated in the fuel cell stack during operation of the fuel cell system, thus achieving a reduction in manufacturing cost and a lightweight structure. Since the drain valve can be automatically opened and closed without any power or controller, it is possible to simplify the configuration of the system.

Since the drain valve 30 of the present invention is opened by air flow generated when the vehicle is traveling, i.e., by traveling wind moving from the front of a vehicle body to the rear, it should be installed at a position where it can directly receive the traveling wind. Moreover, since the cooling water reservoir is located at the bottom of the front of the vehicle body in the fuel cell vehicle, the drain valve is installed on one side of the front of the reservoir housing 21 of the reservoir 20 to directly receive the traveling wind.

The configuration of the drain valve 30 will be described in more detail below.

Figure 4:
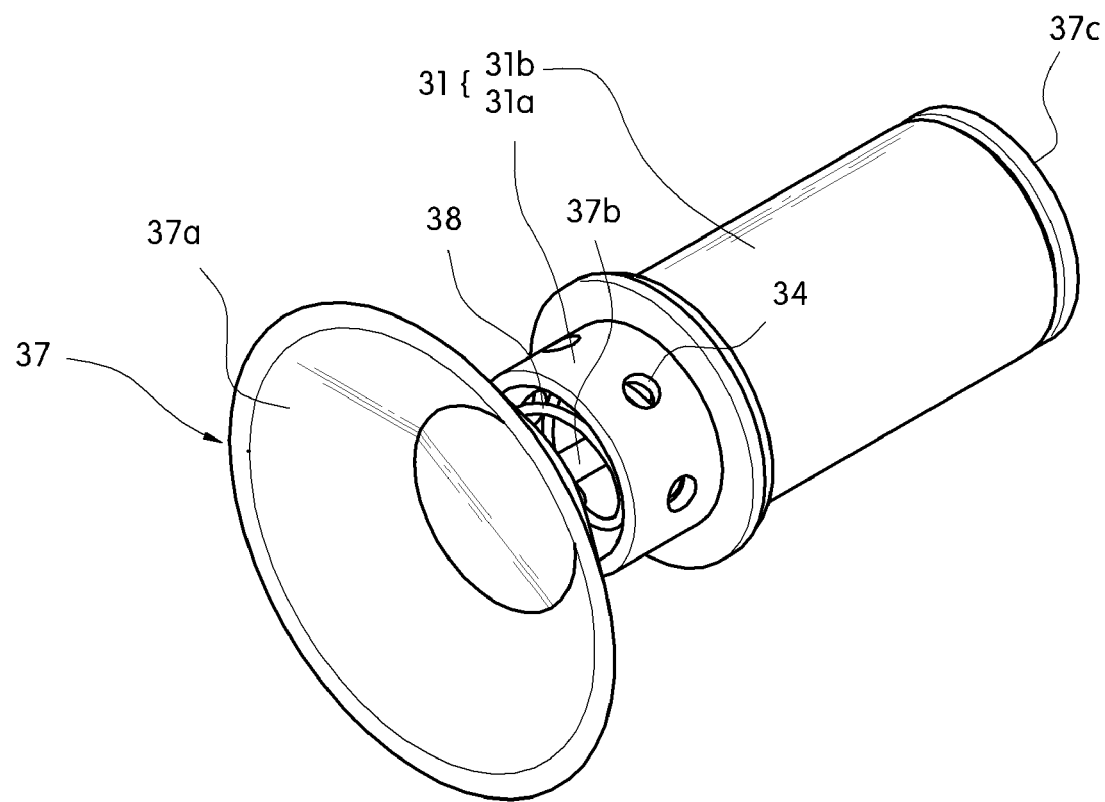
FIG. 4 is an assembled perspective view of the drain valve in accordance with the present invention.
Figure 5:
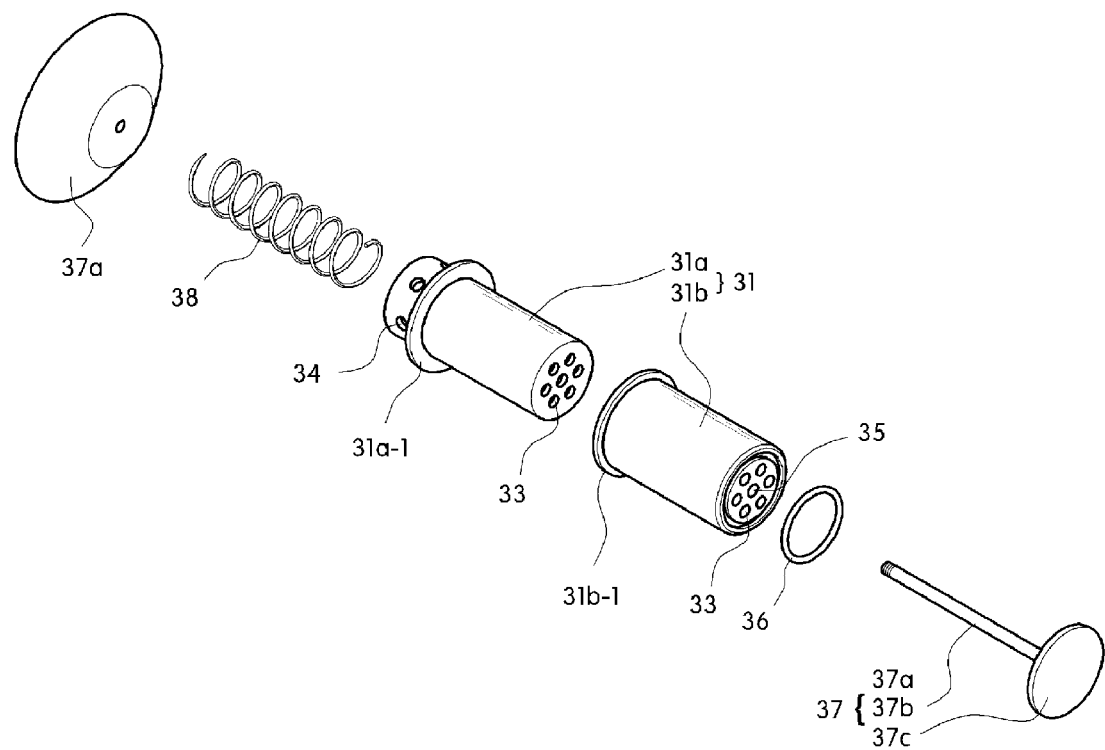
FIG. 5 is an exploded perspective view of the drain valve in accordance with the present invention.
Figure 6A:
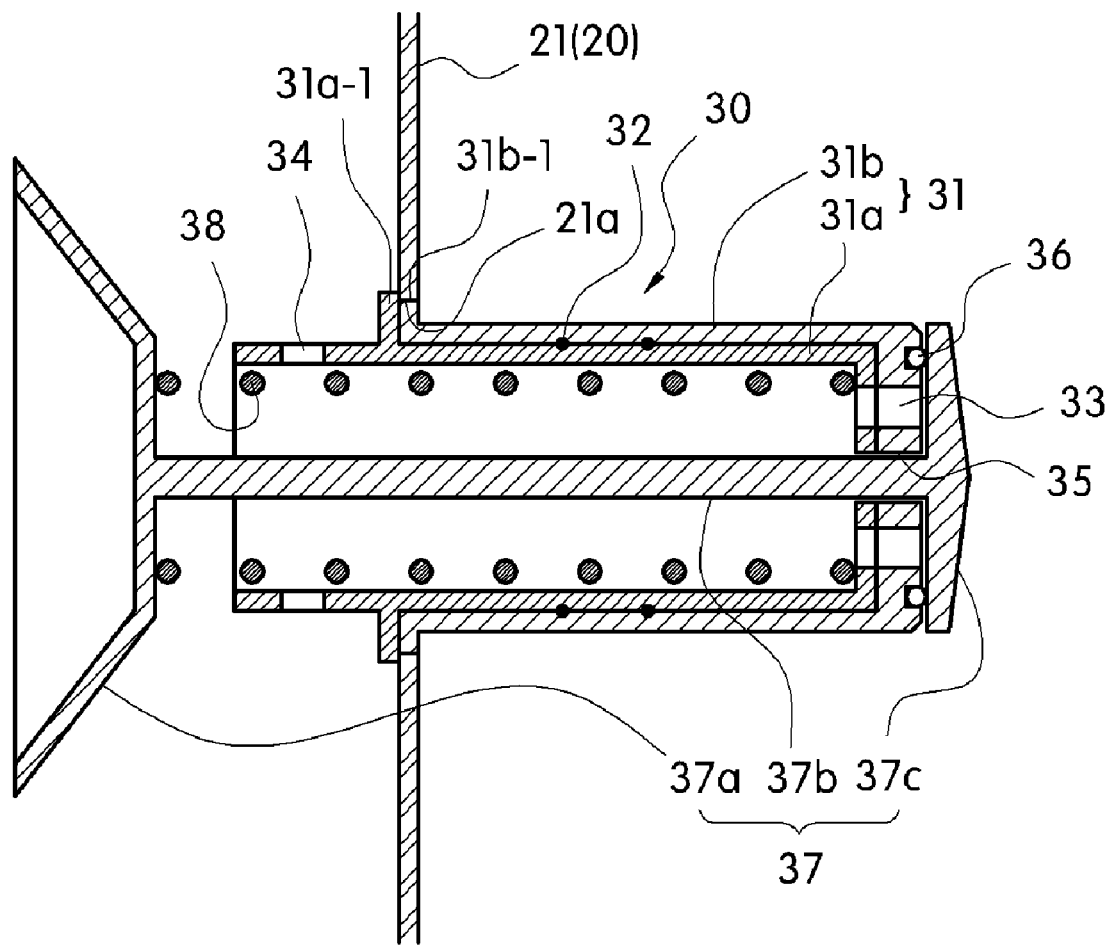
FIGS. 6A and 6B are cross-sectional views showing operation states of the drain valve in accordance with the present invention.
Figure 6B:
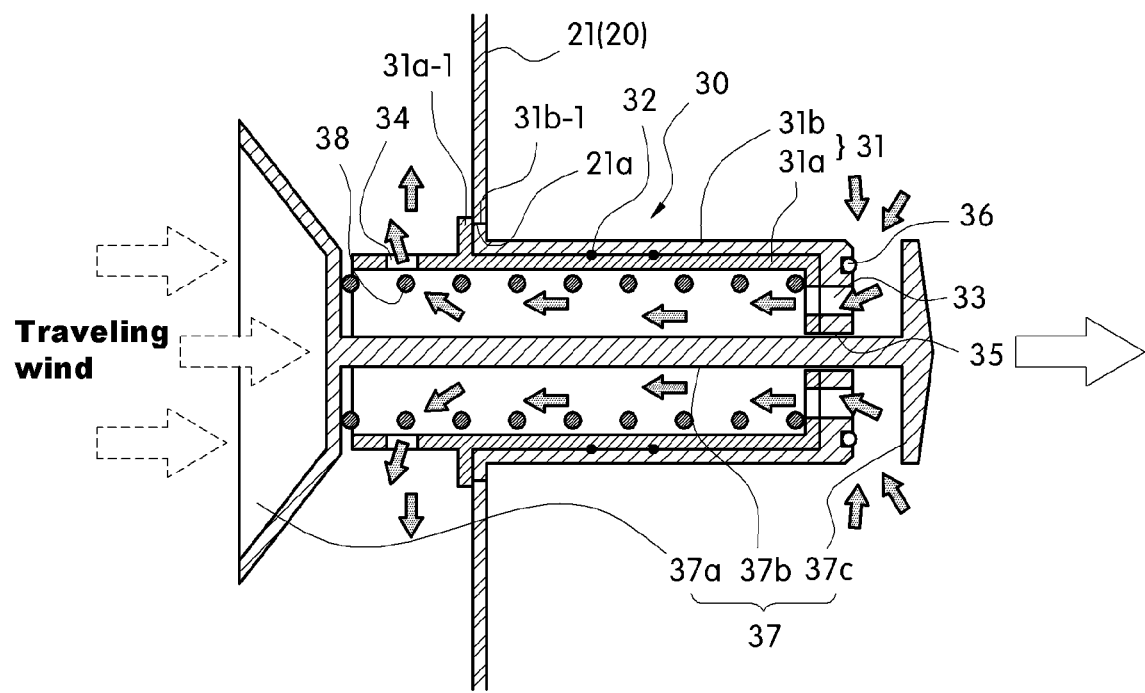

FIG. 4 is an assembled perspective view of the drain valve in accordance with the present invention, FIG. 5 is an exploded perspective view thereof, and FIGS. 6A and 6B are cross-sectional views showing operation states of the drain valve.

The drain valve 30 of the present invention opened by the pressure of traveling wind comprises a valve housing 31, an operating valve rod 37, and an elastic member 38. The valve housing 31 has an internal passage through which water (cooling water) passes and is fixed to a drain port 21a of the reservoir housing 21. The operating valve rod 37 has a structure in which a wind receiving plate 37a, a rod portion 37b, and a shielding plate 37c are integrally formed such that it moves forward and backward to open and close the internal passage of the valve housing 31. The elastic member 38 allows the operating valve rod 37 to be elastically operated.

The valve housing 31 is formed into a tubular shape having a predetermined cross section and length and having a closed rear end such that the internal space forms the internal passage. Moreover, the valve housing 31 may have a dual tube structure in which an inner housing 31a and an outer housing 31b overlap each other. An O-ring 32 for sealing is interposed between the inner housing 31a and the outer housing 31b.

The valve housing 31 is inserted and fixed to the reservoir housing 21 of the reservoir 20 through the drain port 21a. A portion of the valve housing 31 is positioned inside the reservoir housing 21 and the other portion is positioned outside the reservoir housing 21. Mounting ends 31a-1 and 31b-1 projecting in the radial direction are formed at the boundary between the inner portion and the outer portion of the inner housing 31a and the outer housing 31b, respectively. Accordingly, the mounting ends 31a-1 and 31b-1 are fixed to the drain port 21a of the reservoir housing 21 by, e.g., welding or press-fitting such that the entire drain valve 30 is connected to the reservoir housing 21.

A plurality of inlet ports 33 are formed on the rear end wall of the valve housing 31, which is positioned inside the reservoir housing 21, and a plurality of outlet ports 34 are formed on the front side wall of the valve housing 31, which is positioned outside the reservoir housing 21, as shown in FIG. 5.

The plurality of inlet ports 33 may be arranged on the rear end wall of the valve housing 31 in the circumferential direction at regular intervals around a through-hole 35, through which the rod portion 37b of the operating valve rod 37 penetrates.

The inlet ports 33 are configured to be closed by the shielding plate 37c when the operating valve rod 37 moves forward. An O-ring 36 is mounted on the outside surface of the rear end wall of the valve housing 31 to ensure perfect sealing when the shielding plate 37c is in close contact with the rear end wall of the valve housing 31 to close the inlet ports 33. The O-ring 36 prevents water from leaking between the shielding plate 37c and the rear end wall of the valve housing 31 to the inlet ports 33.

The plurality of outlet ports 34 may be arranged on the front side wall of the valve housing 31 in the circumferential direction at regular intervals.

As a result, when the inlet ports 33 of the valve housing 31 are opened by the shielding plate 37c of the operating valve rod 37, the water in the reservoir housing 21 flowing through the inlet ports 33 moves to the outside of the reservoir housing 21 through the internal passage, i.e., the internal space of the valve housing 31 and is then discharged through the outlet ports 34.

Meanwhile, the operating valve rod 37 has a structure in which the wind receiving plate 37a is installed on the front end of the rod portion 37b and the shielding plate 37b is installed on the rear end. The operating valve rod 37 is elastically supported by the elastic member 38 installed inside the valve housing 31 to elastically move forward and backward in the inside of the valve housing 31.

For example, the elastic member 38 may be implemented by a coil spring mounted between the rear surface of the wind receiving plate 37a and the rear end wall of the valve housing 31. The coil spring expands and contracts in the internal space of the valve housing 31 so as to allow the operating valve rod 37 to elastically move forward and backward.

The drain valve 30 having the above-described configuration is installed at a position where traveling wind is applied to the wind receiving plate 37a within the reservoir housing 21, for example, on the front surface of the reservoir housing 21. In this case, when the wind receiving plate 37a located in front of the drain valve 30 is pressed by the pressure of traveling wind applied to the front surface thereof, the entire operating valve rod 37 is moved backward such that the shielding plate 37c opens the inlet ports 33 of the valve housing 31.

The operation of the drain valve 30 will be described with reference to FIGS. 6A and 6B below.

FIG. 6A shows a state where the vehicle is stopped, in which traveling wind is not applied to the wind receiving plate 37a.

At this time, the position of the operating valve rod 37 moved forward is maintained by the force of the elastic member 38, i.e., the coil spring, and in this state, the shielding plate 37c closes the inlet ports 33 of the valve housing 31. As a result, the water filled in the inside of the reservoir housing 21 cannot be discharged to the outside.

On the contrary, FIG. 6B shows a state where the vehicle is traveling, in which traveling wind is applied to the wind receiving plate 37a and, as a result, the wind receiving plate 37a is moved backward. When the vehicle is traveling during operation of the fuel cell system, the drain valve 30 is opened and, in this state, the product water generated in the fuel cell stack is collected in the reservoir housing 21 of the reservoir 20 and then immediately discharged.

At this time, since the wind receiving plate 37a is moved backward by the traveling wind, the elastic member 38, i.e., the coil spring, is compressed by the wind receiving plate 37a, and thereby the entire operating valve rod 37 is moved backward.

Like this, when the operating valve rod 37 is moved backward by the traveling wind, the inlet ports 33 being closed by the shielding plate 37c are opened and, at this time, the outlet ports 34 formed on the front side wall of the valve housing 31 are open. As a result, the water flowing through the inlet ports 33 passes through the internal passage, i.e., the internal space, of the valve housing 31 and is then discharged through the outlet ports 34 to the outside of the reservoir housing 21.

In the state where the water in the reservoir housing 21 is discharged through the drain vale 30, if the vehicle is stopped again, the pressure of traveling wind is removed, and thereby the operating valve rod 37 is moved forward by the restoring force of the coil spring 38. At this time, since the inlet ports 33 of the valve housing 31 are closed again by the shielding plate 37c, the water in the reservoir housing 21 is not discharged through the drain valve 30.

FIG. 7 is a schematic diagram showing a reservoir for a fuel cell vehicle in accordance with the present invention before start-up and during operation.

Height h2 at which the drain valve is installed on the front surface of the reservoir housing should be determined by considering the entire water storage capacity of the reservoir housing and the amount of cooling water supplied to the cooling water line of the cooling system.

In more detail, the cooling water filled in the reservoir housing of the reservoir is pumped up to the cooling water line by the operation of the suction pump after start-up of the fuel cell system. In this state, the drain valve is opened by traveling wind during traveling of the vehicle.

When a predetermined amount (for example, 13 L) of cooling water corresponding to the capacity of the cooling water line is supplied to the cooling water line during the initial start-up, a portion of water remains in the reservoir housing of the reservoir. On the assumption that no product water flows in the reservoir housing, it is preferable that a predetermined amount (for example, 3 L) of water remaining after the cooling water is supplied to the cooling water line not be discharged even if the drain valve is opened. Moreover, it is necessary that the product water (for example, α L corresponding to the amount of water discharged through the drain valve during operation), generated in the fuel cell stack during operation of the fuel cell system and flowing in the reservoir, be discharged to the outside in real-time, except for the predetermined amount of water that should remain in the reservoir.

For this purpose, the drain valve should be installed at a predetermined height (h2) from the bottom surface of the reservoir housing by considering the predetermined amount (e.g., 3 L) of water that should remain in the reservoir after the cooling water is supplied to the cooling water line.

As such, in the case where the height of the drain valve is determined such that the predetermined amount (e.g., 3 L) of water, calculated by subtracting the amount of cooling water (e.g., 13 L) in the cooling water line from an appropriate water storage capacity (e.g., 16 L) of the reservoir (reservoir housing), may remain in the reservoir housing of the reservoir even in a state where the drain valve is open, the water in an amount corresponding to the amount of product water, generated in the fuel cell stack during operation of the fuel cell system and flowing in the reservoir housing, can be discharged to the outside of the vehicle automatically in real-time. As a result, only a fixed amount of water (e.g., 3 L) remains in the reservoir at all times during traveling of the vehicle.

Therefore, it is possible to prevent the water in the reservoir housing from overflowing even if the cooling water of the cooling water line flows down to the reservoir housing of the reservoir after the vehicle is turned off.

As described above, according to the water reservoir of the present invention, since the drain valve mounted in the water reservoir is automatically opened by traveling wind while the vehicle is traveling, it is not necessary to install an expensive electronic valve, and it is possible to automatically discharge unnecessary water from the water reservoir without any controller or power supply in the vehicle traveling condition. Since a relatively inexpensive mechanical drain valve is used in the present invention, it is possible to achieve a reduction in manufacturing cost and a lightweight structure.

Especially, when the drain valve of the present invention is mounted in a cooling water reservoir for a fuel cell vehicle, the water in an amount corresponding to the amount of product water, generated in the fuel cell stack during operation of the fuel cell system and flowing in the reservoir, can be discharged through the drain valve automatically in real-time during traveling of the vehicle. As a result, it is possible to effectively prevent the water in the reservoir housing from overflowing due to the inflow of the product water generated in the fuel cell stack during operation of the fuel cell system.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A water reservoir for a vehicle including a reservoir housing capable of storing and discharging water, the water reservoir comprising a drain valve installed in the reservoir housing and being able to be opened by traveling wind to discharge water during traveling of the vehicle, wherein the drain valve comprises:

a valve housing installed in the reservoir housing and including an inlet port formed on a rear end wall of the valve housing positioned inside the reservoir housing and an outlet port formed on a front side wall of the valve housing positioned outside the reservoir housing;

an operating valve rod including a wind receiving plate which is installed on a front surface of the valve housing and moved by traveling wind and a shielding plate which is movable integrally with the wind receiving plate to open and close the inlet port of the valve housing; and an elastic member disposed between the valve housing and the operating valve rod.

2. The water reservoir of claim 1, wherein the water reservoir is a cooling water reservoir for a fuel cell vehicle, the cooling water reservoir storing cooling water in a reservoir housing, supplying the cooling water to a cooling water line for cooling a fuel cell stack, and collecting product water, generated in the fuel cell stack during operation, in the reservoir housing.

3. The water reservoir of claim 2, wherein the drain valve installed in the reservoir housing is positioned at a predetermined height from a bottom surface of the reservoir housing, the height being set to a water level obtained by subtracting an amount of cooling water in the cooling water line from a water storage capacity of the reservoir housing, such that the water in an amount corresponding to the amount of the product water, generated in the fuel cell stack and flowing in the reservoir housing, is discharged through the drain valve in real-time, except for the amount of the cooling water pumped to the cooling water line during operation of the fuel cell stack.

4. The water reservoir of claim 1, wherein the operating valve rod has a structure in which the wind receiving plate is installed on a front end of a rod portion, the shielding plate is installed on a rear end of the rod portion, and the rod portion is inserted into the valve housing to penetrate a through-hole formed on a rear end wall of the valve housing, such that the shielding plate opens and closes the inlet port positioned inside the reservoir housing.

5. The water reservoir of claim 4, wherein the inlet port is formed to penetrate the rear end wall of the valve housing so as to be able to be closed when the shield plate is in close contact with the rear end wall of the valve housing.

6. The water reservoir of claim 5, wherein an O-ring for sealing is interposed between the rear end wall of the valve housing and the shielding plate.

7. The water reservoir of claim 1, wherein the elastic member is a coil spring mounted between a rear surface of the wind receiving plate and the rear end wall of the valve housing.

* * * * *